United States Patent
Okui (10) Patent No.: US 7,609,015 B2
(45) Date of Patent: Oct. 27, 2009

(54) LOAD DRIVING DEVICE AND ELECTRICAL APPARATUS USING THE SAME

(75) Inventor: Hideki Okui, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 228 days.

(21) Appl. No.: 11/836,281

(22) Filed: Aug. 9, 2007

(65) Prior Publication Data

US 2008/0036407 A1    Feb. 14, 2008

(30) Foreign Application Priority Data

Aug. 10, 2006    (JP) ............... 2006-218205

(51) Int. Cl.
*H02H 7/08*    (2006.01)

(52) U.S. Cl. ............... 318/400.21; 318/400.22; 318/400.17

(58) Field of Classification Search ............ 318/400.22, 318/400.21, 400.17, 434, 433, 432; 327/110
See application file for complete search history.

(56) References Cited

U.S. PATENT DOCUMENTS

2001/0028235 A1 *   10/2001   Fukushi et al. ............... 318/685

FOREIGN PATENT DOCUMENTS

| JP | 08-033382 | 2/1996 |
|----|-----------|--------|
| JP | 08-223925 | 9/1996 |
| JP | 11-299283 | 10/1999 |

* cited by examiner

*Primary Examiner*—Karen Masih
(74) *Attorney, Agent, or Firm*—Fish & Richardson P.C.

(57) ABSTRACT

A load driving device includes a driver that supplies drive current to a load having an inductance component, a current sensing resistor that generates sensed voltage corresponding to switching current that flows in the driver, a switch circuit that delivers one of the sensed voltage and a predetermined bias voltage selectively, a comparator that compares a selected voltage of the switch circuit with a predetermined reference voltage, and a logic circuit that generates a drive control signal for the driver based on a comparison output signal of the comparator, so as to perform constant-current chopping control of the drive current with improved stability of the constant-current chopping control while avoiding malfunction due to noise.

9 Claims, 5 Drawing Sheets

LOAD DRIVING DEVICE AND ELECTRICAL APPARATUS USING THE SAME

CROSS-REFERENCE TO RELATED APPLICATIONS

This application is based on Japanese Patent Application No. 2006-218205 filed on Aug. 10, 2006 the contents of which are hereby incorporated by reference.

BACKGROUND OF THE INVENTION

1. Field of the Invention

The present invention relates to a load driving device that drives and controls a load having an inductance component (e.g., a motor coil that constitutes a motor) and to an electrical apparatus that uses the load driving device.

2. Description of Related Art

Figure 4:
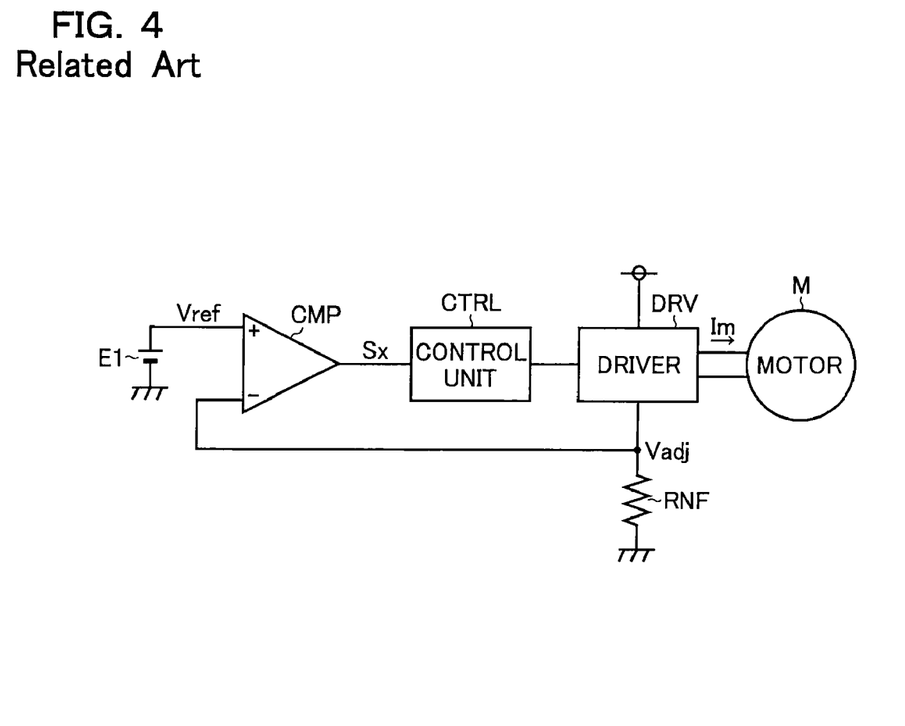
FIG. 4 is a circuit diagram showing a conventional example of the motor driving device.

FIG. 4 is a block diagram showing a conventional example of a motor driving device.

As shown in FIG. 4, the conventional motor driving device includes a driver DRV that supplies a drive current Im to a motor M, a current sensing resistor RNF that generates a sensed voltage Vadj corresponding to switching current flowing in the driver DRV (i.e., corresponding to the drive current Im), a comparator CMP that compares the sensed voltage Vadj with a predetermined reference voltage Vref and a control circuit CTRIJ that generates a drive control signal for the driver DRV based on a comparison output signal Sx of the comparator CMP, so as to perform constant-current chopping control (on and off control) of the drive current Im.

As conventional techniques related to the above description are disclosed in JP-A-H11-299283, JP-A-H8-33382 and the like.

JP-A-H11-299283, which is filed by the same applicant as the present application, discloses a sensorless motor driver including a comparator circuit that compares a counter electromotive voltage generated by each phase of a brushless motor with a neutral voltage of the phase so as to generate a rectangular wave signal, a mask circuit that masks the rectangular wave signal with a noise mask signal having a noise mask period, a mask signal generating circuit that generates the noise mask signal, a drive signal forming portion that forms a drive signal based on the rectangular wave signal masked by the mask circuit and a current supplying portion that supplies a drive current to the brushless motor based on the drive signal. This sensorless motor driver further includes a current sensing portion that senses the drive current and a portion that changes the noise mask period based on an output signal of the current sensing portion.

JP-A-H8-33382 discloses a driving device of a brushless motor including a plurality of driving transistors that supply the drive current to a plurality of phases of motor drive coils, a torque command signal generating circuit that senses the motor drive current so as to generate a torque command signal, a current distributing circuit that supplies current in accordance with an output signal of the torque command signal generating circuit to bases of the plurality of driving transistors sequentially, a trapezoidal wave current synthesizer that delivers the trapezoidal wave current to the current distributing circuit, a counter electromotive force detector that detects a counter electromotive force generated in the motor drive coil and shapes a waveform of the same and a mask signal generator that delivers a signal for masking a part of the signal waveform to the counter electromotive force detector.

The conventional motor driving device shown in FIG. 4 can surely maintain the drive current Im for the motor M at a desired value by the constant-current chopping control of the drive current Im.

Figure 5:
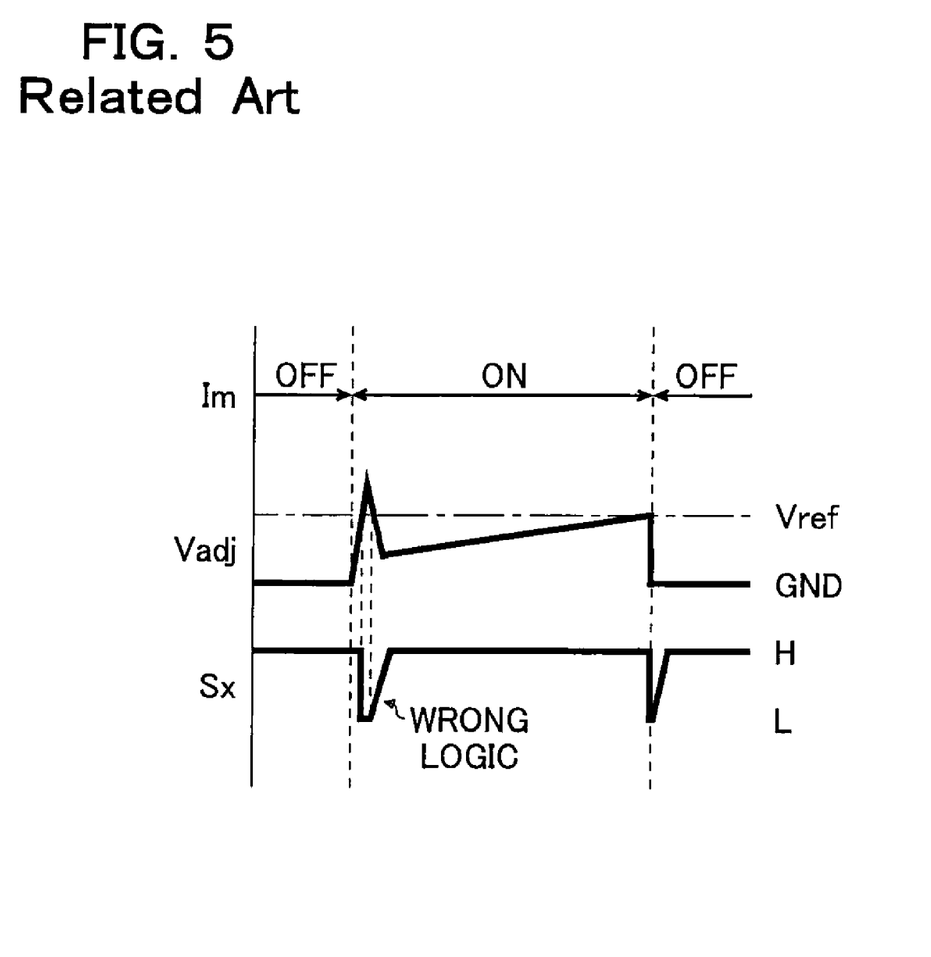
FIG. 5 is a timing chart for explaining malfunction caused from noise.

However, the conventional motor driving device described above has a possibility of causing a malfunction in the constant-current chopping control of the drive current Im when a spike noise (a ringing noise) caused from switching operation of the driver DRV is added to the sensed voltage Vadj as shown in FIG. 5, so that the comparison output signal Sx of the comparator CMP changes to an unintentional wrong logic.

Note that each of the conventional techniques disclosed in JP-A-H11-299283 and JP-A-H8-33382 is a technique for masking noise in the counter electromotive voltage generated in the motor coil, and both documents do not disclose about the spike noise caused from the constant-current chopping control of the drive current or a malfunction caused from the spike noise.

In addition, each of the conventional techniques disclosed in JP-A-H11-299283 and JP-A-H8-33382 has a structure for masking process on the output signal of the comparator or the counter electromotive force detector, and the masking process should be performed until the output signal recovers from a wrong logical state to a correct logical state. Therefore, reduction of the mask period (i.e., improvement of chopping frequency) is restricted by an operational speed of the comparator.

SUMMARY OF THE INVENTION

An object of the present invention is to provide a load driving device that is capable of avoiding malfunction caused from noise so that stability of the constant-current chopping control can be improved, and an electrical apparatus that uses the load driving device.

A load driving device according to the present invention includes a driver that supplies drive current to a load having an inductance component, a current sensing resistor that generates sensed voltage corresponding to switching current that flows in the driver, a switch circuit that delivers one of the sensed voltage and a predetermined bias voltage selectively, a comparator that compares a selected voltage of the switch circuit with a predetermined reference voltage, and a control circuit that generates a drive control signal for the driver based on a comparison output signal of the comparator. The driver performs constant-current chopping control of the drive current based on the drive control signal.

Other features, elements, steps, advantages and characteristics of the present invention will become more apparent from the following detailed description of preferred embodiments thereof with reference to the attached drawings.

DETAILED DESCRIPTION OF THE PREFERRED EMBODIMENTS

Figure 1:
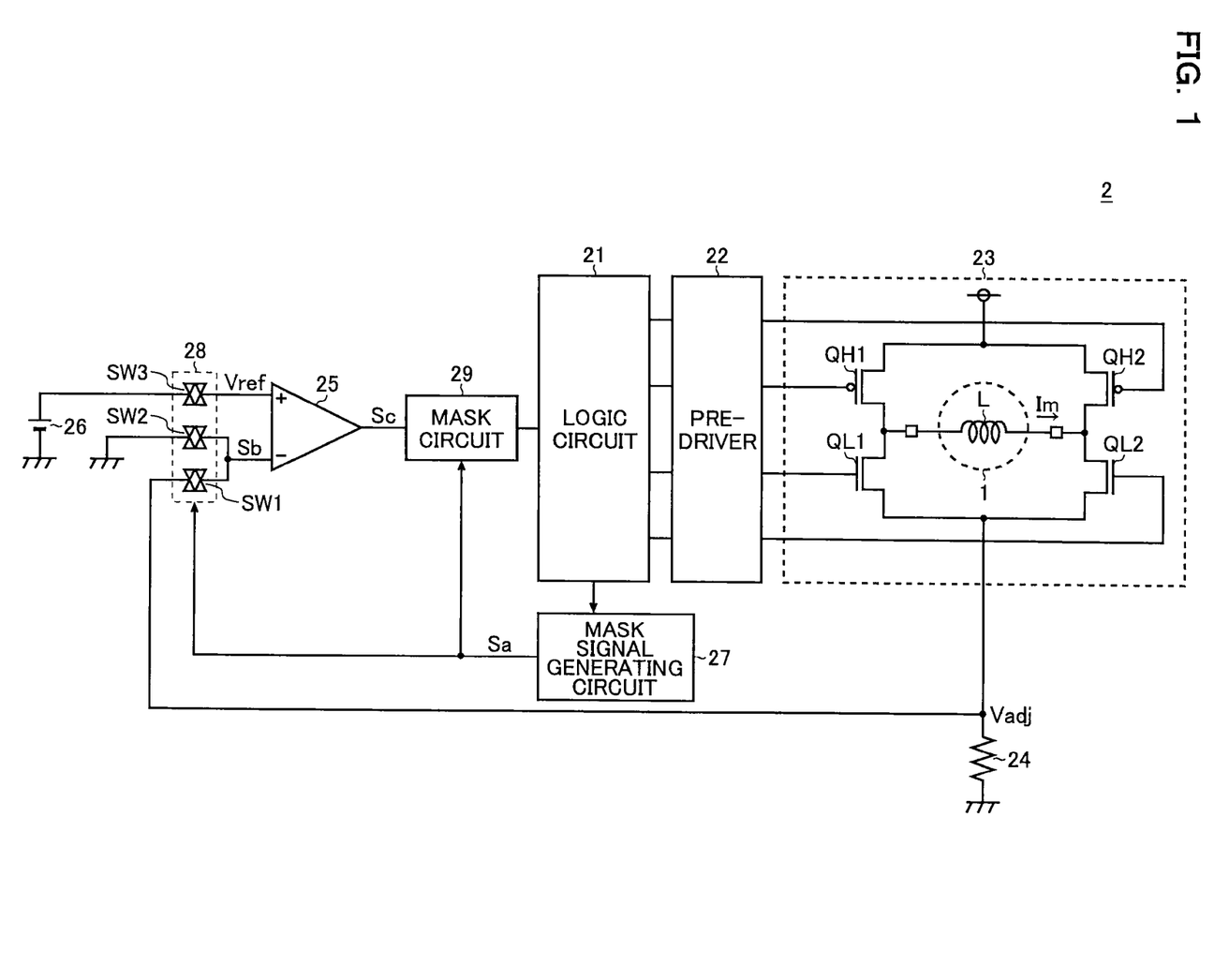
FIG. 1 is a block diagram showing an embodiment of an electrical apparatus equipped with a motor driving device according to the present invention.

FIG. 1 is a block diagram showing an embodiment of an electrical apparatus equipped with a motor driving device according to the present invention (including a circuit element in a part).

As shown in FIG. 1, the electrical apparatus of the present embodiment includes a motor 1 and a motor driving device 2 that controls and drives the motor 1.

The motor 1 is a single phase DC motor that rotates in a direction corresponding to a drive current Im that flows in a motor coil L, and its four operation modes (normal rotation, reverse rotation, braking and idling) are switched by the motor driving device 2.

Note that as an example of a mechanism of the electrical apparatus equipped with the reversible motor 1 described above, there is a tray open/close mechanism of a tray type CD player, a cassette ejection mechanism of a video deck, an automatic paper cut mechanism of a printer, a focus mechanism of a camera, louver open/close mechanism of an air conditioner or the like, and its mounting targets cover very wide variety.

On the other hand, the motor driving device 2 includes a logic circuit 21, a predriver 22, a driver 23, a current sensing resistor 24, a comparator 25, a dc voltage source 26, a mask signal generating circuit 27, a switch circuit 28 and a mask circuit 29.

The logic circuit 21 is a control subject for the predriver 22 and the driver 23, and it is a means that generates a drive control signal for the driver 23 (a predrive control signal for the predriver 22 in the present embodiment) based on a comparison output signal Sc of the comparator 25.

The predriver 22 is a means that performs level shifting and waveform shaping on the predrive control signal that is supplied from the logic circuit 21, so as to generate a drive control signal for the driver 23 (a gate control signal for transistors QH1, QH2, QL1 and QL2 that will be described later).

The driver 23 supplies the drive current Im to the motor coil L (an inductive reactance load having an inductance component) that constitutes the motor 1, and it includes four switch elements (P-channel field-effect transistors QH1 and QH2, and N-channel field-effect transistors QL1 and QL2) that are connected to the motor coil L in an H-bridge style.

Sources of the transistors QH1 and QH2 that are upper side switch elements are both connected to the power source line. Sources of the transistors QL1 and QL2 that are lower side switch elements are both connected to the ground line via the current sensing resistor 24. Drains of the transistors QH1 and QL1 are connected to each other, and the connection node thereof is connected to an end of the motor coil L. Drains of the transistors QH2 and QL2 are connected to each other, and the connection node thereof is connected to the other end of the motor coil L. Note that the transistors QH1, QH2, QL1 and QL2 are controlled to open or close in accordance with drive control signals (gate control signals) that are supplied to their gates, respectively.

In this way, if the field-effect transistor is used as the switch element of the driver 23, responsibility to the on and off control thereof can be enhanced compared with a structure using a bipolar transistor. However, use of the field-effect transistor is not an indispensable condition, and a bipolar transistor may be used.

The current sensing resistor 24 is a means that generates a sensed voltage Vadj corresponding to switching current that flows in the driver 23 (therefore, corresponding to the drive current Im that flows in the motor 1). Note that if the motor driving device 2 is integrated into a semiconductor device, the current sensing resistor 24 may be added to it externally or embedded in it.

The comparator 25 is a means that compares a selected voltage Sb of the switch circuit 28 with a predetermined reference voltage Vref. In the motor driving device 2 of the present embodiment, the inverting input terminal (−) of the comparator 25 is connected to a terminal to which the sensed voltage Vadj is applied, via an analog switch SW1 that constitutes the switch circuit 28, while it is also connected to a terminal to which a predetermined bias voltage (the ground voltage GND in the present embodiment) is applied, via an analog switch SW2 that constitutes the switch circuit 28. The non-inverting input terminal (+) of the comparator 25 is connected to the positive terminal of the dc voltage source 26 via an analog switch SW3 that constitutes the switch circuit 28. Therefore, the comparison output signal Sc of the comparator 25 becomes the high level when the predetermined reference voltage Vref is higher than the selected voltage Sb of the switch circuit 28, while it becomes the low level when the predetermined reference voltage Vref is lower than the selected voltage Sb.

The dc voltage source 26 is a means that generates the predetermined reference voltage Vref corresponding to a restricted current value Ilimit of the drive current Im. Note that the positive terminal of the dc voltage source 26 is connected to the non-inverting input terminal (+) of the comparator 25 via a switch circuit 29, while the negative terminal thereof is connected to the ground line.

The mask signal generating circuit 27 is a means that generates a predetermined mask signal Sa based on the predrive control signal for the predriver 22 generated by the logic circuit 21 (therefore, based on the drive control signal for the driver 23). Note that the mask signal Sa will be described later in detail.

The switch circuit 28 is a means that selects one of the sensed voltage Vadj and the bias voltage (the ground voltage GND) selectively based on the above-mentioned mask signal Sa and delivers the selected voltage Sb to the inverting input terminal (−) of the comparator 25.

Further in the motor driving device 2 of the present embodiment, the switch circuit 28 includes the analog switch SW1 connected between a terminal to which the sensed voltage Vadj is applied (the high potential end of the current sensing resistor 24) and the inverting input terminal (−) of the comparator 25, the analog switch SW2 connected between a terminal to which the predetermined bias voltage (the ground voltage GND) is applied (i.e., the ground line) and the inverting input terminal (−) of the comparator 25, and the analog switch SW3 connected between a terminal to which the reference voltage Vref is applied (i.e., the positive terminal of the dc voltage source 26) and the non-inverting input terminal (+) of the comparator 25. Note that the analog switch SW1 and the analog switch SW2 are turned on and off complementarily while the analog switch SW3 is turned on normally.

The structure described above enables input impedances to match each other between the non-inverting input terminal (+) and the inverting input terminal (−) of the comparator 25.

The mask circuit 29 is a means (a logical gate means) that performs a masking process on the comparison output signal Sc based on the mask signal Sa.

Next, constant-current chopping control performed by the motor driving device 2 having the structure described above will be described in detail with reference to FIG. 2.

Figure 2:
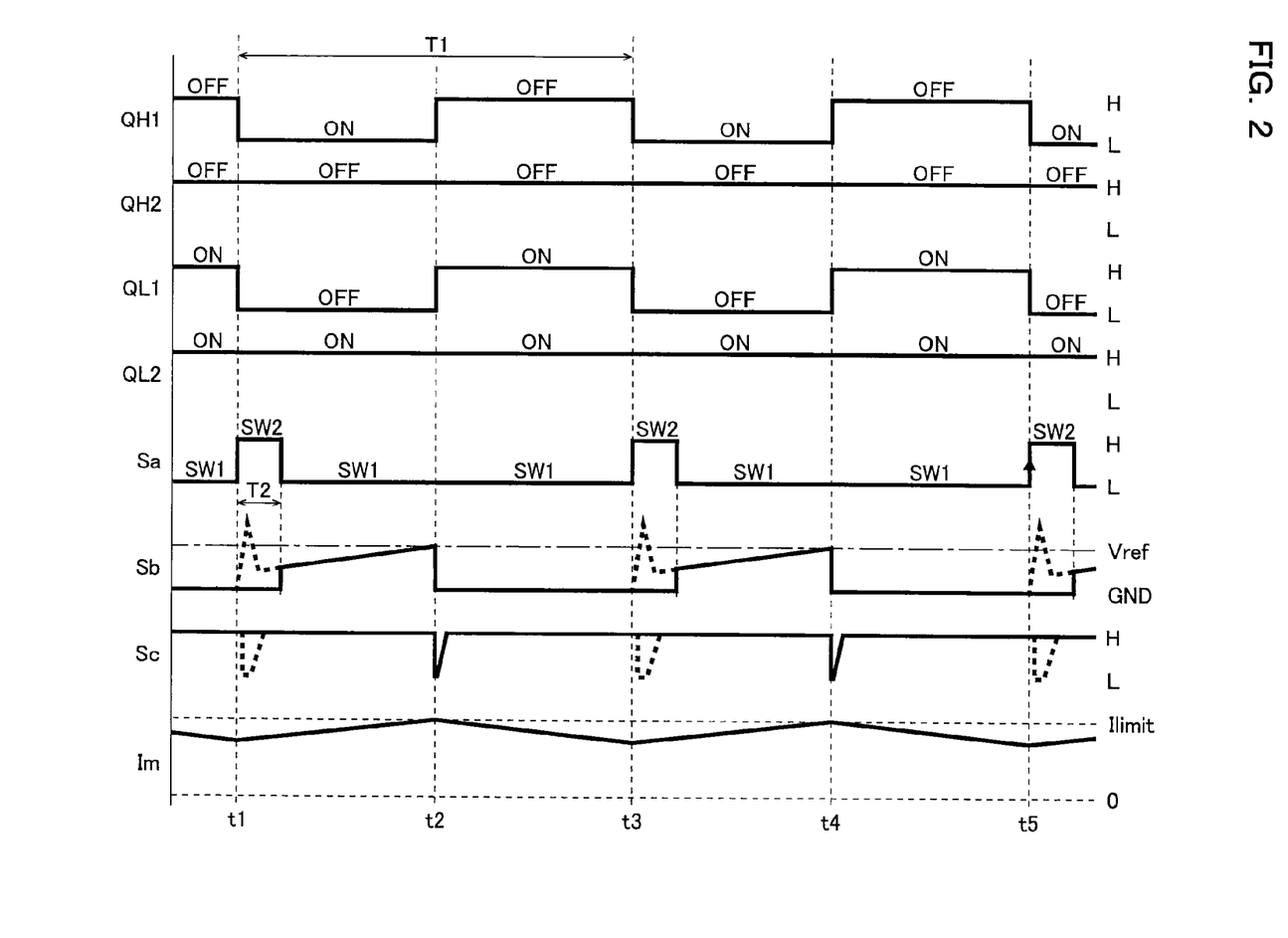
FIG. 2 is a timing chart for explaining constant-current chopping control performed by the motor driving device.

FIG. 2 is a timing chart for explaining the constant-current chopping control performed by the motor driving device 2.

Note that the signs "QH1", "QH2", "QL1" and "QL2" on the left side in FIG. 2 indicate respective logical states of drive control signals (gate control signals) supplied to gates of the transistors QH1, QH2, QL1 and QL2 that constitute the driver 23. In addition, the signs "Sa", "Sb" and "Sc" indicate voltage waveforms of the mask signal Sa, the selected voltage Sb and the comparison output signal Sc, respectively. The sign "Im" indicates a current waveform of the drive current Im.

First, a basic operation of the constant-current chopping control will be described.

When the motor 1 is driven by normal rotation drive, the logic circuit 21 supplies the individual drive control signals (the gate control signals) via the predriver 22 so that the transistors QH1 and QL2 are turned on while the transistors QH2 and QL1 are turned off(see the time period t1 to t2). According to this switching control, the motor coil L that constitutes the motor 1 is supplied with the drive current Im from the power source line to the ground line via the transistor QH1, the motor coil L, the transistor QL2 and the current sensing resistor 24.

After the drive current Im is turned on at the time point t1, the selected voltage Sb (it is supposed here that the sensed voltage Vadj is selected and delivered) reaches up to the reference voltage Vref at the time point t2. When the comparison output signal Sc falls to the low level, the logic circuit 21 determines that the drive current Im has reached the predetermined restricted current value Ilimit. Then, it turns off the transistors QH1 and QH2 via the predriver 22 so that the drive current Im is turned off, and it supplies the individual drive control signals (gate control signals) so that the transistors QL1 and QL2 are turned off (see the time period t2 to t3). According to this switching control, the drive current Im flowing from the power source line to the motor coil L is turned off, and regenerative current flows in the motor coil L via the transistor QL1 and the transistor QL2.

After the drive current Im from the power source line is turned off at the time point t2, the logic circuit 21 turns on the transistors QH1 and QL2 via the predriver 22 time point t4 so that the drive current Im is turned on again with a predetermined switching period T1, and it supplies the individual drive control signals (gate control signals) so that the transistors QH2 and QL1 are turned off (see the time period t3 to t4). After this time point, the switching control similar to the above-mentioned one is repeated.

Therefore, in the motor driving device 2 of the present embodiment, the logic circuit 21 generates the drive control signal for the driver 23 (the predrive control signal for the predriver 22 in the present embodiment) so that the drive current Im is turned on with the predetermined switching period T1 while the drive current Im is turned off based on a logical change of the comparison output signal Sc (change to the low level in the present embodiment). Thus, the transistors QH1 and QL2 are driven complementarily by PWM (Pulse Width Modulation) so that the constant-current chopping control of the drive current Im is performed.

According to this structure, the drive current Im of the motor 1 can be maintained at a desired value by the constant-current chopping control of the drive current Im.

In addition, since the motor driving device 2 of the present embodiment can utilize the regenerative current of the motor 1 in the period while the drive current Im from the power source line is turned off (see the time period t2 to t3 and the time period t4 to t5), power savings of the apparatus can be realized.

Although the switch timing of the transistor QH1 is the same as that of the transistor QL1 in FIG. 2 for simplifying the description, there is actually a period for turning off the both transistors in order to prevent feedthrough current.

Next, a noise mask operation using the switch circuit 28 will be described.

In the constant-current chopping control of the drive current Im described above, a spike noise (a ringing noise) due to the switching operation of the driver 23 is added to the sensed voltage Vadj when the drive current Im is changed from off to on, as described above. Therefore, if the sensed voltage Vadj is supplied to the comparator 25 directly, the comparison output signal Sc of the comparator 25 may change to an unintentional wrong logic, which may cause a malfunction in the constant-current chopping control of the drive current Im (see the broken line at the time point t1, the time point t3 and the time point t5).

Therefore, the motor driving device 2 of the present embodiment is equipped with a means that masks the above-mentioned spike noise before the comparator 25, and the means is a switch circuit 28 disposed on a feedback input line of the sensed voltage Vadj. Thus, one of the sensed voltage Vadj and the bias voltage (the ground voltage GND) is selected based on the mask signal Sa generated by the mask signal generating circuit 27, and the selected voltage Sb is delivered to the comparator 25.

Furthermore, the mask signal Sa synchronizes with the gate control signals for the transistor QH1 and the transistor QL1 as shown in FIG. 2. After the drive current Im is turned on at the time point t1 (in the same manner at the time point t3 or the time point t5) until a predetermined mask period T2 passes, the analog switch SW1 is turned off while the analog switch SW2 is turned on as a first logical state (the high level in the present embodiment). In other time period, the analog switch SW1 is turned on while the analog switch SW2 is turned off as a second logical state (the low level in the present embodiment).

Therefore, the switch circuit 28 selects and delivers the predetermined bias voltage (the ground voltage GND) after the drive current Im is turned on until the predetermined mask period T2 passes, while it selects and delivers the sensed voltage Vadj in the other time period.

Note that a voltage value of the bias voltage that is selected and delivered in the above-mentioned mask period T2 is set to the ground voltage GND so that the comparison output signal Sc of the comparator 25 is normally the high level, i.e., so that the drive current Im is maintained normally to be turned on.

According to this structure, even if the spike noise is added to the sensed voltage Vadj in the constant-current chopping control of the drive current Im, the comparator 25 does not react to the spike noise. Thus, a change of the comparison output signal Sc to an unintentional wrong logic can be prevented.

Therefore, the motor driving device 2 of the present embodiment can avoid a malfunction in the constant-current chopping control due to the spike noise, and it becomes unnecessary to make the operating speed of the comparator 25 (in particular, the operating speed in restoring from the low level to the high level) high wastefully also when the mask period T2 (therefore, the switching period T1) is reduced. In other words, since the motor driving device 2 of the present embodiment can reduce the mask period T2 (therefore, the switching period T1) without depending on the operating speed of the comparator 25, average current in a low current region can be reduced.

Furthermore, although only the mask operation using the switch circuit 28 is sufficient from a viewpoint of preventing the malfunction due to the spike noise, the motor driving device 2 of the present embodiment further includes the mask circuit 29 that is connected between the comparator 25 and the logic circuit 21. Based on the mask signal Sa, the masking process of the comparison output signal Sc is performed after the drive current Im is turned on until the predetermined mask period T2 passes.

According to this structure, even if a noise is added to the selected voltage Sb or the comparison output signal Sc itself in the constant-current chopping control of the drive current Im, propagation of the noise to the logic circuit 21 can be prevented so that a malfunction in the constant-current chopping control can be avoided more securely.

Although the embodiment described above exemplifies only the case where the motor 1 is driven to rotate normally, the constant-current chopping control and mask control are performed also in the case where the motor 1 is driven to rotate reversely, in the same manner as the case described above.

In addition, although the embodiment described above exemplifies a structure in which the single phase DC motor is a drive target, the application objects of the present invention are not limited to the structure. It can be applied widely to load driving devices that perform control and drive of a load having an inductance component, including a motor driving device for driving other motors (a voice coil motor, a stepping motor and the like).

In addition, the structure of the present invention is not limited to the embodiment described above but can be modified within the scope of the present invention without deviating from the spirit thereof.

For example, although the embodiment described above exemplified the structure in which the P-channel field-effect transistor is used as the upper switch element of the driver 23, the present invention is not limited to this structure but can use an N-channel field-effect transistor as the same. In this case, a means that generates a gate voltage of the upper switch element can use a charge pump circuit that multiplies the power supply voltage, or it can use a bootstrap output stage that bootstraps the gate voltage for the upper switch element with respect to the individual source voltages.

Figure 3:
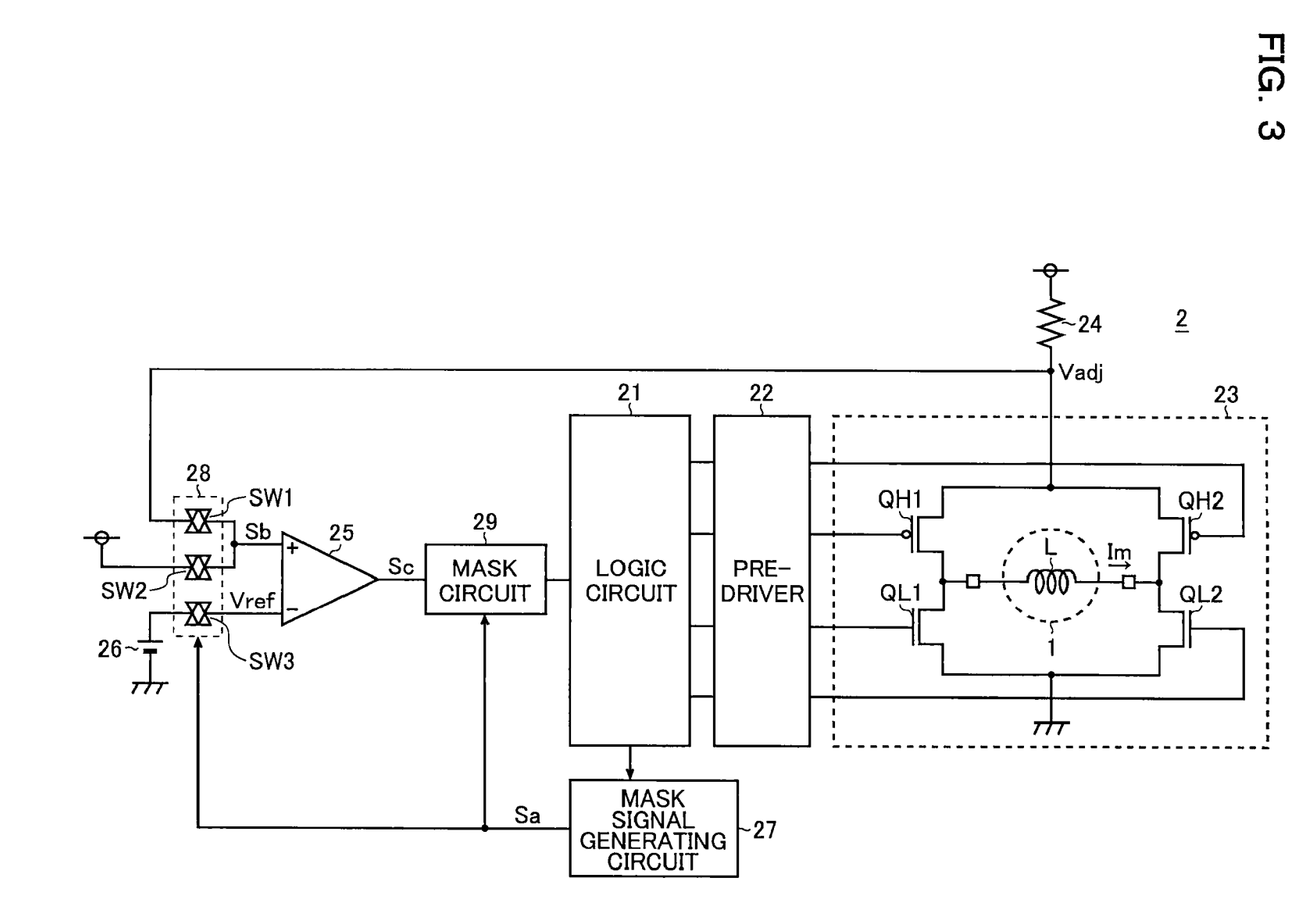
FIG. 3 is a block diagram showing a variation of the motor driving device according to the present invention.

In addition, although the embodiment described above exemplifies the structure in which the current sensing resistor 24 is disposed between the driver 23 and the ground line, the present invention is not limited to this structure. For example, as shown in FIG. 3 (a variation of the motor driving device 2), it is possible to adopt the structure in which the current sensing resistor 24 is disposed between the power source line and the driver 23. In this case, a voltage value of the bias voltage that is selected and delivered to the comparator 25 via the analog switch SW2 so that the drive current Im is normally turned on during the mask period should be set to the power supply voltage.

Note that an effect of the present invention is that a malfunction due to a noise can be avoided and that stability of the constant-current chopping control can be enhanced.

In addition, speaking of industrial availability of the present invention, the present invention is very useful for improving stability in the constant-current chopping control for a load driving device that controls and drives a load having an inductance component, for example, a motor driving device that controls and drives a motor.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A load driving device comprising:
    a driver that supplies drive current to a load having an inductance component;
    a current sensing resistor that generates sensed voltage corresponding to switching current that flows in the driver;
    a switch circuit that delivers one of the sensed voltage and a predetermined bias voltage selectively;
    a comparator that compares a selected voltage of the switch circuit with a predetermined reference voltage; and
    a control circuit that generates a drive control signal for the driver based on a comparison output signal of the comparator, wherein
    the driver performs constant-current chopping control of the drive current based on the drive control signal.

2. The load driving device according to claim 1, wherein
    the control circuit generates the drive control signal for the driver so as to turn on the drive current at a predetermined period and to turn off the drive current based on a logical change of the comparison output signal, and
    the switch circuit delivers the bias voltage selectively after the drive current is turned on until a predetermined mask period passes, while it delivers the sensed voltage in other period.

3. The load driving device according to claim 1, wherein the switch circuit includes
    a first analog switch that is connected between a terminal to which the sensed voltage is applied and an input terminal of the comparator,
    a second analog switch that is connected between a terminal to which the bias voltage is applied and an input terminal of the comparator, and
    a third analog switch that is connected between a terminal to which the reference voltage is applied and the other input terminal of the comparator, and
    the first analog switch and the second analog switch are turned on and off in a complementary manner while the third analog switch is turned on normally.

4. The load driving device according to claim 1, further comprising a mask circuit that is connected between the comparator and the control circuit so as to perform a masking process of the comparison output signal after the drive current is turned on until a predetermined mask period passes.

5. An electrical apparatus comprising:
    a load having an inductance component; and
    a load driving device that controls and drives the load, wherein load driving device includes
    a driver that supplies drive current to the load,
    a current sensing resistor that generates sensed voltage corresponding to switching current that flows in the driver,
    a switch circuit that delivers one of the sensed voltage and a predetermined bias voltage selectively,
    a comparator that compares a selected voltage of the switch circuit with a predetermined reference voltage, and
    a control circuit that generates a drive control signal for the driver based on a comparison output signal of the comparator, and
    the driver performs constant-current chopping control of the drive current based on the drive control signal.

6. The electrical apparatus according to claim 5, wherein
    the control circuit generates the drive control signal for the driver so as to turn on the drive current at a predetermined period and to turn off the drive current based on a logical change of the comparison output signal, and the switch circuit delivers the bias voltage selectively after the drive current is turned on until a predetermined mask period passes, while it delivers the sensed voltage in other period.

7. The electrical apparatus according to claim 5, wherein the switch circuit includes a first analog switch that is connected between a terminal to which the sensed voltage is applied and an input terminal of the comparator, a second analog switch that is connected between a terminal to which the bias voltage is applied and an input terminal of the comparator, and a third analog switch that is connected between a terminal to which the reference voltage is applied and the other input terminal of the comparator, and the first analog switch and the second analog switch are turned on and off in a complementary manner while the third analog switch is turned on normally.

8. The electrical apparatus according to claim 5, wherein the load driving device further includes a mask circuit that is connected between the comparator and the control circuit so as to perform a masking process of the comparison output signal after the drive current is turned on until a predetermined mask period passes.

9. The electrical apparatus according to claim 5, wherein the load is a motor coil that constitutes a motor.

\* \* \* \* \*